(12) United States Patent
Kuesel et al.

(10) Patent No.: US 9,134,779 B2
(45) Date of Patent: *Sep. 15, 2015

(54) POWER DISTRIBUTION MANAGEMENT IN A SYSTEM ON A CHIP

(71) Applicant: International Business Machines Corporation, Armonk, NY (US)

(72) Inventors: Jamie R. Kuesel, Rochester, MN (US); Mark G. Kupferschmidt, Bothell, WA (US); Paul E. Schardt, Rochester, MN (US); Robert A. Shearer, Woodinville, WA (US)

(73) Assignee: International Business Machines Corporation, Armonk, NY (US)

( * ) Notice: Subject to any disclaimer, the term of this patent is extended or adjusted under 35 U.S.C. 154(b) by 107 days.

This patent is subject to a terminal disclaimer.

(21) Appl. No.: 13/683,049

(22) Filed: Nov. 21, 2012

(65) Prior Publication Data

US 2014/0143558 A1   May 22, 2014

(51) Int. Cl.
*G06F 1/00* (2006.01)
*G06F 1/26* (2006.01)

(52) U.S. Cl.
CPC .......................................... *G06F 1/26* (2013.01)

(58) Field of Classification Search
CPC ................................ G06F 1/26; G06F 1/3203
USPC ............................ 713/340, 300, 320; 365/226
See application file for complete search history.

(56) References Cited

U.S. PATENT DOCUMENTS

| | | | |
|---|---|---|---|
| 7,696,813 B2 | 4/2010 | Mizuno | |
| 7,930,578 B2 | 4/2011 | Bose et al. | |
| 8,335,123 B2 * | 12/2012 | Sprouse | 365/226 |
| 8,775,834 B2 * | 7/2014 | Herdrich et al. | 713/300 |
| 2003/0217295 A1 | 11/2003 | Sadowski | |
| 2006/0236011 A1 | 10/2006 | Narad et al. | |
| 2007/0204176 A1 * | 8/2007 | Shaffer et al. | 713/300 |
| 2008/0250415 A1 | 10/2008 | Illikkal et al. | |
| 2008/0256371 A1 * | 10/2008 | Diab et al. | 713/300 |
| 2008/0263373 A1 * | 10/2008 | Meier et al. | 713/300 |
| 2008/0301475 A1 * | 12/2008 | Felter et al. | 713/300 |
| 2009/0089602 A1 * | 4/2009 | Bose et al. | 713/340 |

(Continued)

OTHER PUBLICATIONS

Ramage et al., Mechanism for facilitating power, WO2013/095531A1 , PCT Application.*

(Continued)

*Primary Examiner* — Chun Cao
*Assistant Examiner* — Aurel Prifti
(74) *Attorney, Agent, or Firm* — Middleton Reutlinger

(57) ABSTRACT

A method, circuit arrangement, and program product for dynamically reallocating power consumption at a component level of a processor. Power tokens representative of a power consumption metric are allocated to interconnected IP blocks of the processor, and as additional power is required by an IP block to perform assigned operations, the IP block may communicate a request for additional power tokens to one or more interconnected IP blocks. The interconnected IP blocks may grant power tokens for the request based on a priority, availability, and/or power consumption target. The requesting IP block may modify power consumption based on power tokens granted by interconnected IP blocks for the request. A power management block may adjust power token allocation of one or more IP blocks by communicating a command to one or more IP blocks and/or by adjusting a power token request.

18 Claims, 15 Drawing Sheets

(56) References Cited

U.S. PATENT DOCUMENTS

| | | | |
|---|---|---|---|
| 2010/0162024 A1* | 6/2010 | Kuris et al. | 713/340 |
| 2011/0060927 A1* | 3/2011 | Fillingim et al. | 713/320 |
| 2012/0023345 A1* | 1/2012 | Naffziger et al. | 713/320 |
| 2013/0318371 A1* | 11/2013 | Hormuth | 713/320 |
| 2015/0033045 A1* | 1/2015 | Raghuvanshi et al. | 713/320 |

OTHER PUBLICATIONS

Kanter, David, Llano at Hot Chips, http://www.realworldtech.com/llano-update/, Aug. 31, 2011.

U.S. Patent and Trademark Office, Office Action issued in related U.S. Appl. No. 13/682,999, dated Oct. 7, 2014.

\* cited by examiner

POWER DISTRIBUTION MANAGEMENT IN A SYSTEM ON A CHIP

FIELD OF THE INVENTION

The invention is generally related to data processing, and in particular to power management for processor architectures and IP blocks incorporated therein.

BACKGROUND

Power management is an increasingly important aspect of processor design. For mobile and battery powered applications, for example, minimizing power consumption to maximize battery life is often a key design parameter. In addition, in high performance applications such as supercomputers and massively parallel computers, hundreds or thousands of processors may be arranged in close proximity to one another and generate a substantial amount of heat and consume a substantial amount of power, so controlling power consumption to manage power and heat output is also of considerable importance in these applications.

In some conventional processing architectures the amount of components that may be configured on a processor may exceed the amount of components that may be powered at a particular time. In these conventional processors, power generally needs to be distributed such the appropriate components are powered at the appropriate times. In conventional systems, power may be distributed to different dedicated areas comprising a plurality of components dedicated to a particular processing task (e.g., a dedicated graphics processing unit group of components) of the processor. However, such wide granularity power distribution generally fails to address the quickly changing power needs of individual components. The inability to address power distribution at the component level generally leads to low performance.

Some processor architectures may include IP blocks, where an IP block generally represents a reusable unit of synchronous or asynchronous logic design used as a building block for data processing within the processor. In general, IP blocks comprise reusable units of logic, cell, or chip layout design and may be considered logic cores that can be formed as ASIC chip designs or FPGA logic designs. As such, in general, an IP block may be considered a component of a processor.

To address such scenarios, a processor may be designed to support the maximum power needed if every component of the processor were consuming the maximum amount of power; however, a processor designed to support the maximum power needed generally requires more area dedicated to power support and reduces the amount of area available for processing components. In addition, such processors generally consume more power than is actually required to perform all the processing functions required of the processor.

Therefore, a continuing need exists in the art for power distribution systems and methods in processor architectures.

SUMMARY OF THE INVENTION

The invention addresses these and other problems associated with the prior art by controlling power consumption at an IP block level of a processor using power tokens allocated to the various IP blocks in a processor. In such embodiments, power consumption of interconnected IP blocks of a processor may be controlled using a distributed power management method and circuit arrangement in which power tokens are distributed to each interconnected IP block. Such power tokens generally correspond to a type of power consumption metric, including for example, a run time, a quantity of instructions to execute, a quantity of memory transactions to perform, and/or other such types of power consumption metrics. Consistent with embodiments of the invention, each IP block controls power consumption based on power tokens allocated to the particular IP block at any given time. A power management block may monitor power consumption of the interconnected IP blocks, and the power management block may control power consumption at the interconnected IP blocks by adjusting power token allocation of one or more of the interconnected IP blocks. The power management block may control power consumption of the interconnected IP blocks based on a power consumption target associated with each IP block and/or the processor, a processing priority associated with each IP block, and/or a type of operation associated with each IP block.

Whenever an IP block requires additional power, the IP block may communicate a power token request to at least one other interconnected IP block, and the IP block may receive a response to the power token request that grants one or more additional power tokens, where such additional power tokens were previously allocated to a different interconnected IP block. The power management block may adjust granted power tokens of a communicated power token request to thereby control power consumption at the requesting IP block. Each IP block may modify power consumption based on any additional power tokens granted to the IP block in a received response to a power token request. In addition, the power management block may communicate a command to one or more IP blocks that causes the one or more IP blocks to adjust the power tokens allocated thereto.

As such, in embodiments of the invention, each interconnected IP block may control power consumption for the interconnected IP block based on allocated power tokens. Moreover, each interconnected IP block may request additional power tokens from one or more interconnected IP blocks if needed by communicating a request to one or more interconnected IP blocks and receiving a response from the one or more interconnected IP blocks indicating additional power tokens granted to the requesting IP block. Therefore, embodiments of the invention may control power consumption of one or more interconnected IP blocks by power token allocation and dynamic reallocation of such power tokens.

In some embodiments the power management block may be connected to the interconnected IP blocks. The power management block may adjust power token allocation at one or more of the interconnected IP blocks based on data associated with the interconnected IP blocks. Moreover, the power management block may adjust the quantity of power tokens allocated to one or more of the interconnected IP blocks responsive to a power consumption event, such as the processor switching from a high performance power consumption setting to a power efficiency power consumption setting.

These and other advantages and features, which characterize the invention, are set forth in the claims annexed hereto and forming a further part hereof. However, for a better understanding of the invention, and of the advantages and objectives attained through its use, reference should be made to the drawings, and to the accompanying descriptive matter, in which there is described exemplary embodiments of the invention.

Figure 1:
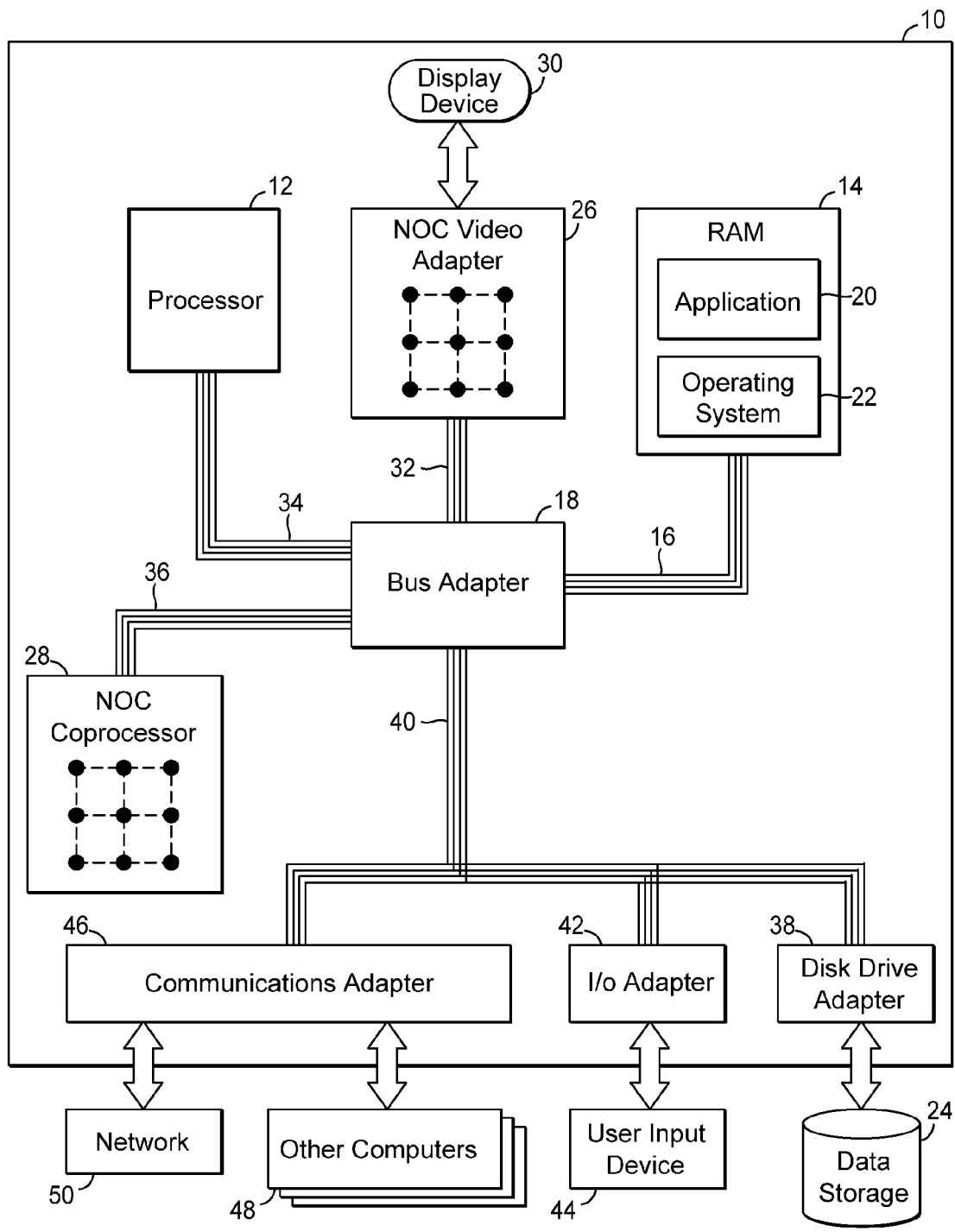
FIG. 1 is a block diagram of exemplary automated computing machinery including an exemplary computer useful in data processing consistent with embodiments of the present invention.

It should be understood that the appended drawings are not necessarily to scale, presenting a somewhat simplified representation of various preferred features illustrative of the basic principles of embodiments of the invention. The specific features consistent with embodiments of the invention disclosed herein, including, for example, specific dimensions, orientations, locations, sequences of operations and shapes of various illustrated components, will be determined in part by the particular intended application, use and/or environment. Certain features of the illustrated embodiments may have been enlarged or distorted relative to others to facilitate visualization and clear understanding.

DETAILED DESCRIPTION

Embodiments consistent with the invention control power consumption at one or more IP blocks interconnected over a communication bus of a processor based at least in part on allocated power tokens allocated to each IP block. A power token generally corresponds to one or more power consumption metrics associated with IP blocks, including for example, run time of the IP block, a quantity of instructions that may be executed by the IP block, a quantity of memory transactions that may be performed by the IP block, and/or any other such metric that may be used to quantify power consumption of an IP block.

Each IP block includes a quantity of power tokens allocated thereto, and each IP block may control power consumption at the IP block based on the allocated power tokens. For example, a first IP block may run (i.e., perform operations) for the run time represented by the number of allocated power tokens, thereby consuming the allocated amount of power. The quantity of allocated power tokens may be set initially based on the type of tasks the IP block performs, the number of instructions generally executed by the IP block, the number of memory transactions generally performed by the IP block, and/or other such factors. Power tokens may be replenished based on a defined replenishment schedule, such that a power consumption for the processor, a group of IP blocks, and/or a particular IP block may be controlled over time.

The processor may allocate power tokens to IP blocks for a given time period such that total power consumption is divided between the IP blocks. For example, the power consumption of the processor may be controlled over a minute time period, where the IP blocks may control power consumption over the one minute time period based on the allocated power tokens. After the minute time period, the IP blocks may again receive an allocation of power tokens. Each subsequent allocation of power tokens may be based at least in part on previous power token usage (i.e., power consumption for one or more defined time periods). Moreover, one or more IP blocks may be allocated a desired number of power tokens based on a priority of tasks associated with the one or more IP blocks, a power consumption target for the one or more IP blocks, and/or a power consumption target for the processor. The dynamic reallocation of power tokens between interconnected IP blocks allows reallocation of power consumption within the power consumption target for interconnected IP blocks while facilitating power consumption flexibility at the IP block level. As such, power consumption may be limited while also maintaining performance by facilitating power consumption flexibility for one or more IP blocks requiring addition power consumption bandwidth.

Moreover, a power token may correspond to a different metric based on the type of operations that are associated with the IP block. However, power tokens corresponding to different metrics may be equivalent based on the typical power consumption associated with such metric. For example, for a first IP block, a power token may correspond to a number of instructions that the first IP block may execute, and for a second IP block, the power token may correspond to a number of memory transactions that the second IP block may perform. In this example, the power consumption represented by the power token may be equivalent regardless of the metric that the particular IP block associates with the power token.

As operations are performed in the processor, each IP block may consume power at different rates, and therefore the power consumption requirements of the interconnected IP blocks may vary. In response to a particular IP block requiring additional power, the IP block may communicate a power token request to one or more of the interconnected IP blocks. The one or more interconnected IP blocks may each receive the request and determine whether any allocated power tokens are available to reallocate to the requesting IP block. In some embodiments, the each IP block that receives the request may adjust the request to indicate a quantity of power tokens that the IP block is granting to the requesting IP block.

In general, an available power token may be considered a power token that is not in use by the IP block to which it is allocated. As a power token is generally representative of a quantity of a type of power consumption metric (e.g., run time, number of instructions to execute, number of memory transactions to perform, etc.), a power token is available if the IP block to which it is allocated is not consuming the power represented by the power token. For example, if a power token corresponds to ten instructions to execute, an IP block has five power tokens associated therewith, and an instruction queue associated with the IP block includes twenty instructions to be executed, three of the power tokens allocated to the IP block may be considered available.

In some embodiments, the IP blocks may be configured in a token ring. In these embodiments, a power token request from a first IP block may be communicated sequentially to each IP block of the token ring. Each IP block may determine a quantity of power tokens available to be granted to the first IP block, adjust the power token request to indicate the cumulative quantity of power tokens granted by each IP block of the token ring and the quantity of power tokens still needed for the request, and communicate the power token request to the next sequential IP block in the token ring. The first IP block may receive the power token request from the token ring as a response to the request, and the IP block may modify power consumption based on the number of power tokens granted by the IP blocks of the token ring.

In some embodiments, the allocation of power tokens to interconnected IP blocks may change as the IP blocks perform operations. For example a first IP block of the interconnected IP blocks may execute instructions only sporadically, while a second IP block of the interconnected IP blocks executes instructions more often than the first IP block. In this example, the communication of power token requests and the dynamic reallocation of power tokens between the interconnected IP blocks may cause the second IP block to include a higher quantity of allocated power tokens than the first IP block.

In some embodiments, a power consumption target may be set for a processor and/or particular components of a processor. In such embodiments, the quantity of power tokens allocated to IP blocks may be based at least in part on the power consumption target. For example, if the processor is operating in a low-power consumption state, the quantity of power tokens allocated to IP blocks of the processor may be less than if the processor is operating in a normal power consumption state. In addition, particular IP blocks may be set to operate in a low-power state, and in such embodiments, a maximum quantity of allocated power tokens may be associated with such IP blocks such that the power consumption may be controlled and limited. Similarly, particular IP blocks may be associated with high priority operations, and as such a minimum quantity of allocated power tokens may be associated with such IP blocks such that the IP blocks retain a minimum number of allocated power tokens to thereby maintain an available power consumption threshold.

In addition, in some embodiments, each IP block may analyze the quantity of power tokens allocated thereto to determine whether any of the power tokens may be unallocated to thereby reduce the maximum power that the IP block may consume. In some embodiments, a processor may adjust a power consumption profile of the processor, a group of IP blocks, and/or a particular IP block by removing (e.g., revoking, unallocating) power tokens from one or more IP blocks, thereby reducing the amount of power that the processor, group of IP blocks, and/or the particular IP block may consume.

In some embodiments of the invention, a power management block may be connected to the interconnected IP blocks. The power management block may comprise an IP block configured to perform the operations described herein for a power management block, and/or the power management block may comprise additional logic necessary to monitor power consumption of the interconnected IP blocks, adjust the allocation of power tokens for one or more of the interconnected IP blocks, and/or analyze power token requests to adjust granted power tokens for the request. In some embodiments, the power management block may not include any IP block functionality.

In general, the power management block may adjust the allocation of power tokens at one or more of the interconnected IP blocks based at least in part on received data associated with the interconnected IP blocks. The data associated with the interconnected IP blocks may include, for example, temperature data associated with the interconnected IP blocks collected by a temperature sensor proximate the interconnected IP blocks, and the power management block may remove (e.g., revoke) allocated power tokens by communicating a command on the communication bus that targets a particular IP block and causes the particular IP block to decrement the quantity of power tokens allocated thereto. The power management block may inject (i.e., allocate or add power tokens) to a particular IP block by communicating a command targeting the particular IP block that causes the particular IP block to increment the quantity of power tokens allocated thereto. Moreover, the power management block may revoke and/or inject power tokens based on a priority associated with each IP block, a measured temperature associated with each IP block, a communication latency associated with IP block, and/or other such attributes/measured data that may be associated with each IP block.

For example, the power management block may receive temperature data associated with the interconnected IP blocks, and based on the temperature data, the power management block may adjust the allocation of power tokens for one or more of the interconnected IP blocks. In this example, if the temperature data indicates that the temperature of the IP blocks is proximate a defined thermal limit (i.e., a temperature threshold), the power management block may decrement the power token allocation of one or more of the IP blocks. If the temperature data indicates the interconnected IP blocks have exceeded a predefined thermal limit, the power management block may decrement the allocated power tokens of a particular IP block that has the lowest communication latency from the power management block associated therewith to thereby response time to exceeding the thermal limit.

In addition, the power management block may adjust power token allocation responsive to a power consumption event. For example, if the interconnected IP blocks are part of a voltage or clock island of the processor, and the voltage or clock island is powered down, the power management block may revoke all the power tokens of the IP blocks of the voltage or clock island. In these embodiments, the revoked power tokens may be communicated to another associated processor a second power management block that manages a second plurality of interconnected IP blocks to thereby allocate the revoked power tokens to the second plurality of interconnected IP blocks for usage.

In addition, the power management block may receive the power token request and adjust the quantity of power tokens allocated for the power token request based on data associated with the interconnected IP blocks, a priority associated with one or more of the interconnected IP blocks, a power management target associated with one or more of the interconnected IP blocks, and/or other various power consumption thresholds or data associated with one or more of the interconnected IP blocks.

Embodiments consistent with the invention therefore control power consumption at an IP block level of a processor using allocated power tokens. Interconnected IP blocks may request additional power tokens from other interconnected IP blocks and may grant available allocated power tokens to requesting interconnected IP blocks. Moreover, power token allocation limits may be associated with one or more IP blocks to thereby manage power consumption for the processor, particular IP blocks, and/or groups of IP blocks.

Hardware and Software Environment

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™, Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
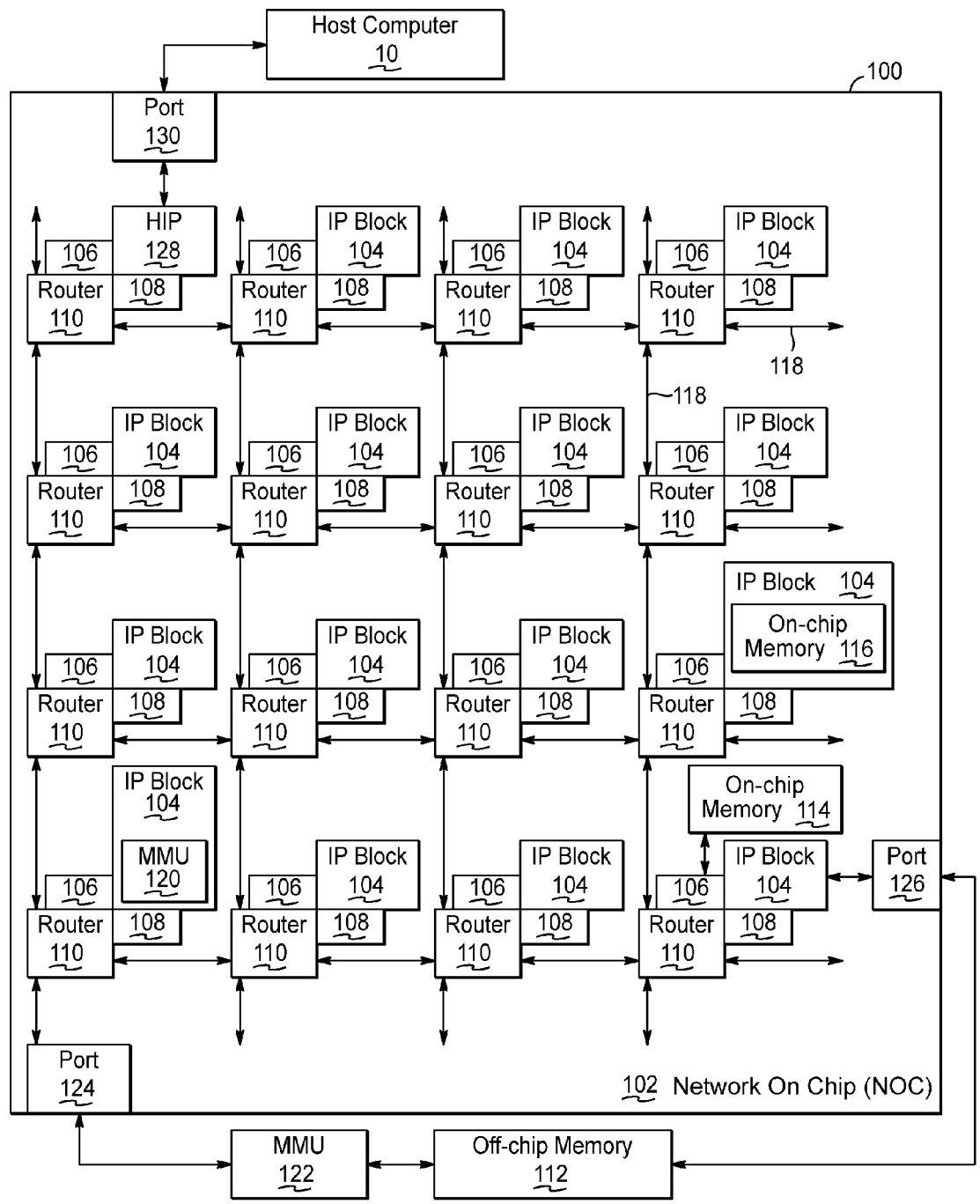
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices, data processing systems utilizing such devices, and other tangible, physical hardware circuits, those of ordinary skill in the art having the benefit of the instant disclosure will appreciate that the invention may also be implemented within a program product, and that the invention applies equally regardless of the particular type of computer readable storage medium being used to distribute the program product. Examples of computer readable storage media include, but are not limited to, physical, recordable type media such as volatile and non-volatile memory devices, floppy disks, hard disk drives, CD-ROMs, and DVDs (among others).

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
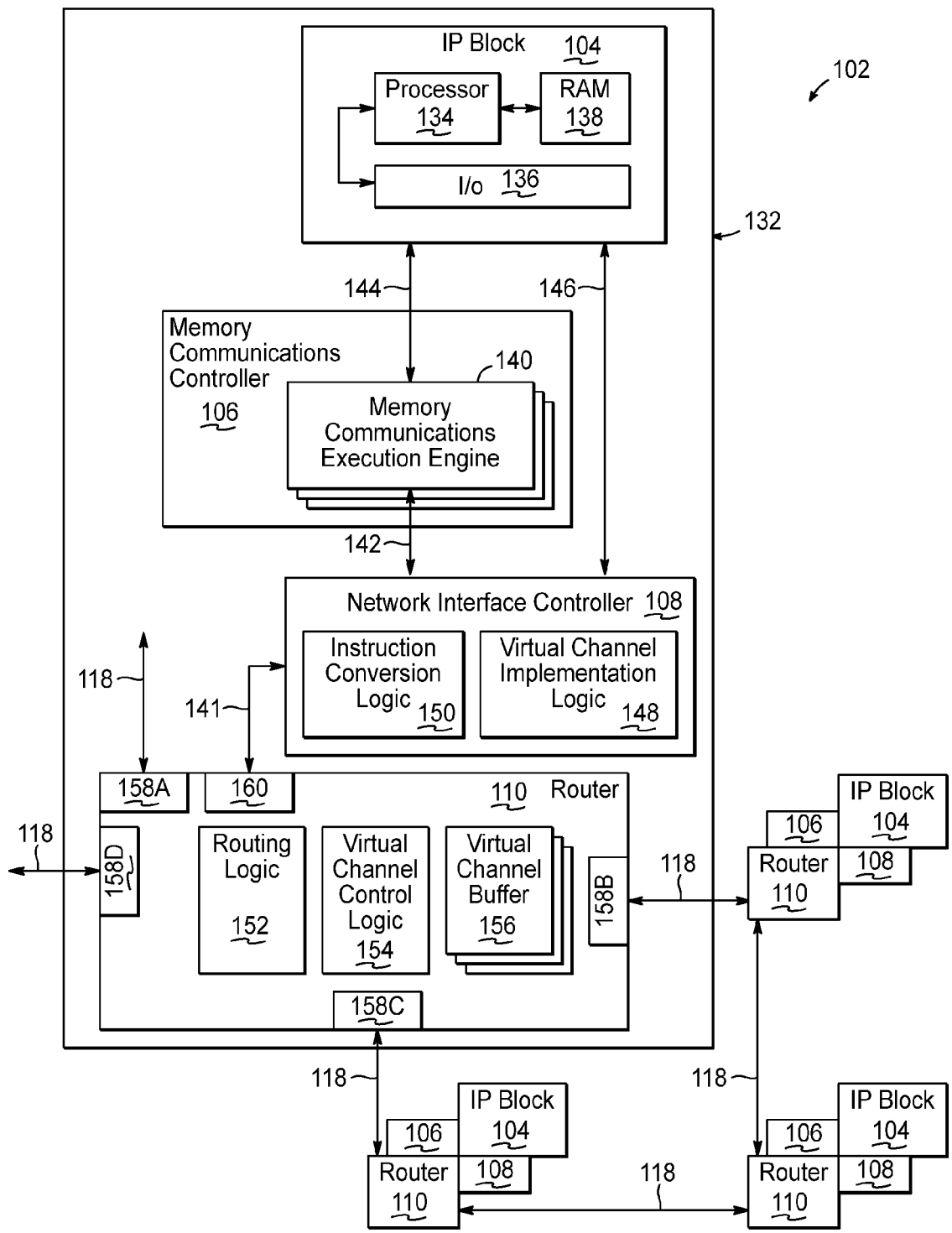
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132 which may be referred to as a node or a hardware thread. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
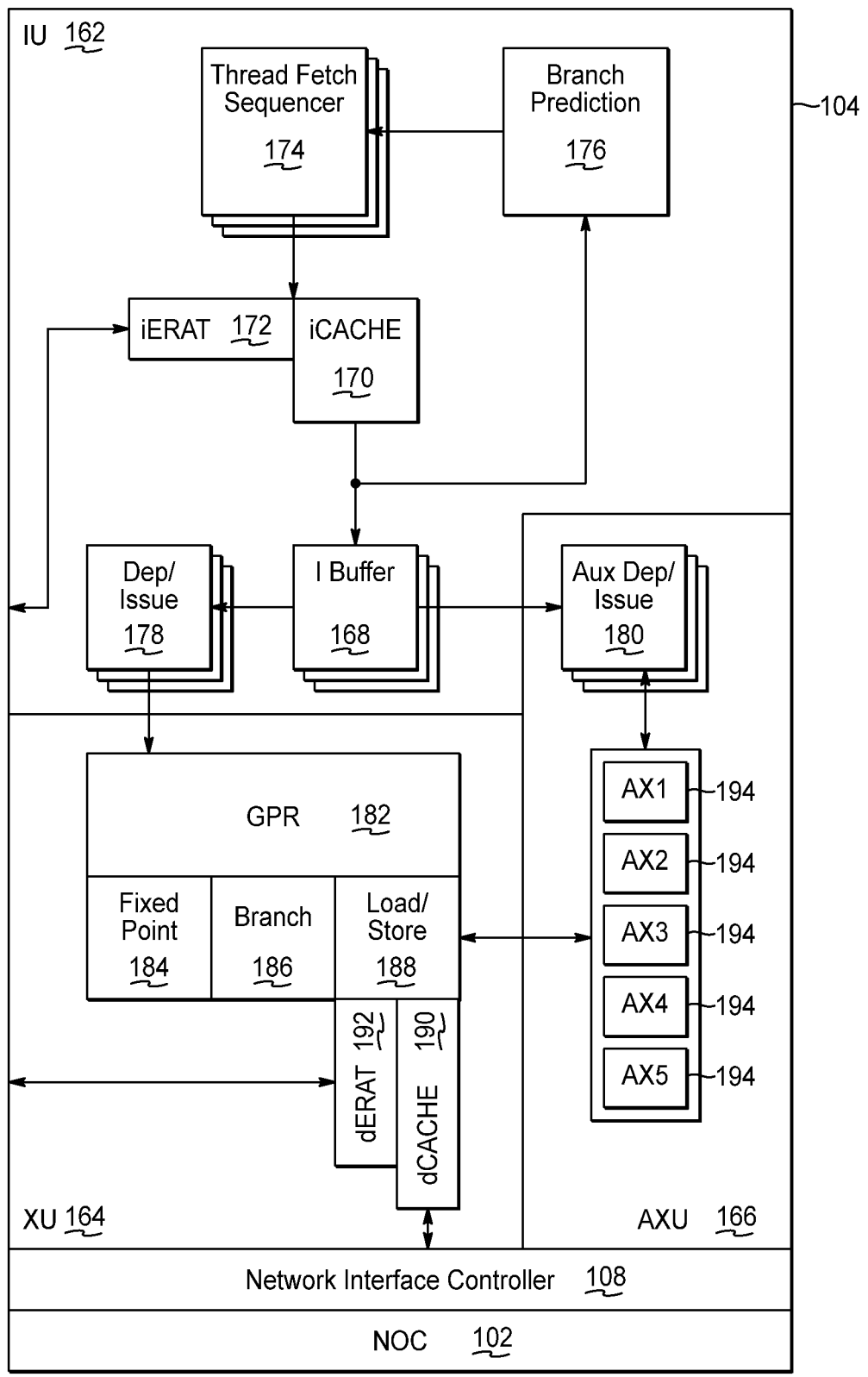
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32b or 64b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks. Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Distributed Chip Level Power System

In some embodiments of the invention a distributed power management scheme is utilized to dynamically allocate power tokens to interconnected IP blocks of a processor. When a first IP block requires additional power, the IP block may communicate a power token request to one or more IP blocks over a communication bus. The communication bus may be monitored/snooped by one or more IP blocks, where the one or more IP blocks may be configured in a power distribution group. For example, the one or more IP blocks monitoring the communication bus may be configured in a token ring such that communications therebetween pass sequentially through each IP block of the token ring. A second IP block monitoring the communication bus may receive the power token request from the first IP block, determine whether to grant any power tokens currently allocated to the second IP block to the first IP block, and adjusting the power token response if any power tokens are granted. The second IP block may forward the power token request over the communication bus such that additional IP blocks may also grant allocated power tokens to the first IP block in the same manner.

A power management block may be connected to the interconnected IP blocks, and the power management block may monitor and adjust power token allocation for the interconnected IP blocks based on data and/or characteristics associated with the interconnected IP blocks. Such data and/or characteristics may include, for example, a temperature associated with one or more of the IP blocks, a processing priority associated with one or more of the IP blocks, a power consumption profile for the processor (e.g., high performance processing of instructions, power efficient processing of instructions), a power consumption target for one or more of the interconnected IP blocks, a type of operation associated with each IP block, and/or various other types of collected data or characteristics. The power management block may monitor and adjust the allocation of power tokens for the interconnected IP blocks by communicating a command to one or more of the interconnected IP blocks and/or adjusting power token requests communicated by the IP blocks.

Figure 5:
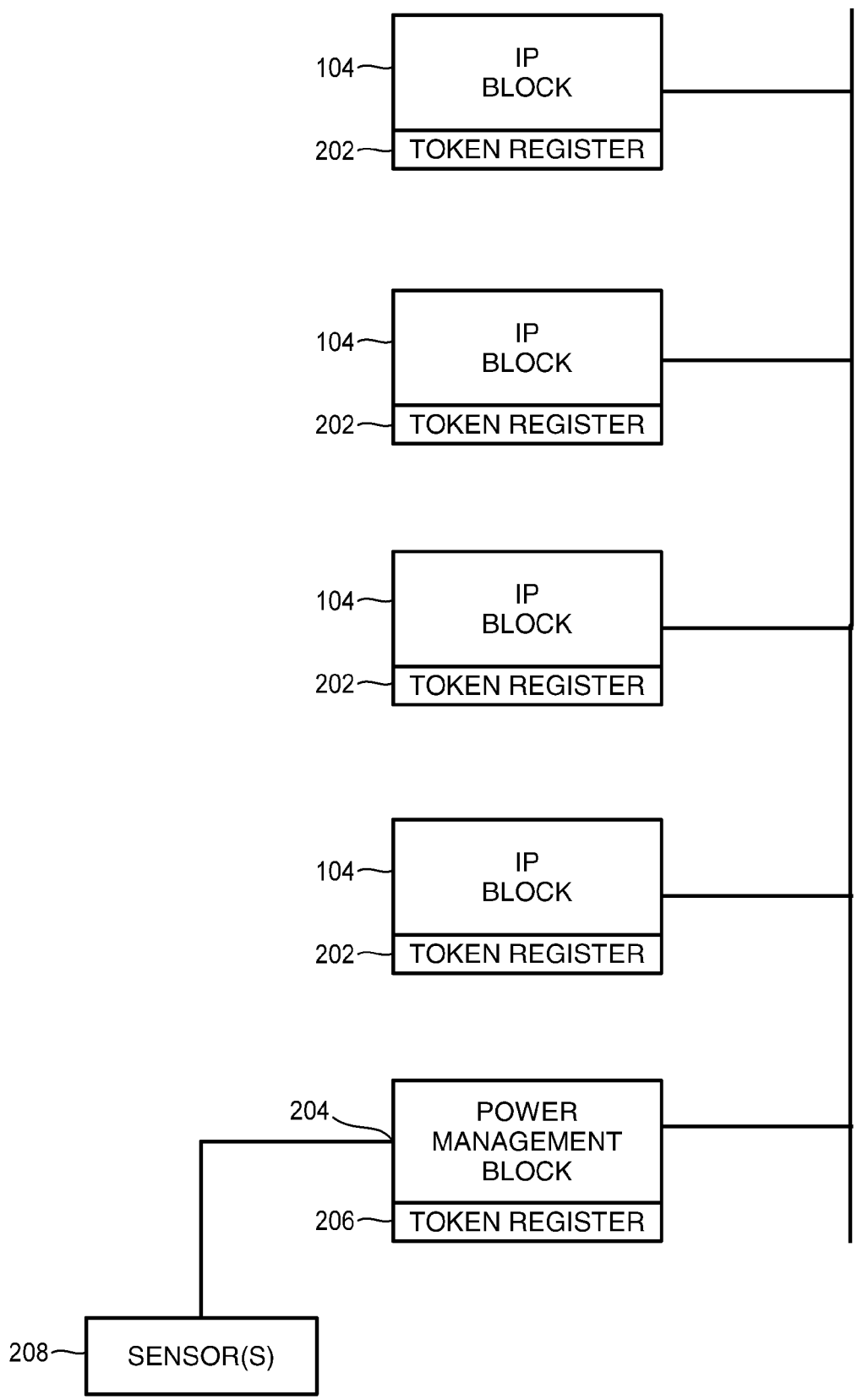
FIG. 5 is a block diagram illustrating an exemplary implementation of a plurality of interconnected IP blocks from the NOC of FIG. 2.

FIG. 5 provides a block diagram illustrating an example of a plurality of IP blocks 104 of a processor consistent with embodiments of the invention connected over a communication bus. As shown, each IP block may include an associated power token register 202. The power token register 202 generally stores data indicating a quantity of power tokens allocated to the associated IP block 104, a quantity of power tokens available, a maximum quantity of power tokens that may be allocated to the associated to the IP block 104, and/or a minimum quantity of power tokens that must be allocated to the associated IP block 104. The power token register 202 may be a software controlled register, such that one or more instructions executed by the processor may adjust the data stored in the power token register 202. For example, the processor may change processing states from a high power mode to a low power mode, and responsive to such change, the processor may execute one or more instructions to reduce the number of power tokens allocated to one or more IP blocks of the processor by adjusting the data of the power token register 202. In such embodiments, instructions may be executed at one or more IP blocks to adjust an associated power token register, and/or an associated processor or co-processor.

In addition, a power management block 204 is connected to the IP blocks 104, where the power management block may include a token register 206. The token register 206 of the power management block 204 may store data indicating power tokens allocated to the plurality of interconnected IP blocks 104 that the power management block has revoked and/or not allocated. In general, the power management block may revoke and/or not allocate power tokens to a particular IP blocks to thereby control power consumption, which in some embodiments may also be performed to thereby control a temperature associated with one or more of the IP blocks. As shown, the power management block 204 may be in communication with one or more sensors 208 that may communicate data collected monitoring the IP blocks 104 to the power management block 204. For example, a sensor 208 may comprise a temperature sensor positioned proximate the IP blocks 104 and configured to collect temperature data associated with the IP blocks 104 and communicate the collected temperature data to the power management block 204.

As discussed, in some embodiments, a required minimum quantity of allocated power tokens may be associated with a particular IP block. In such embodiments, the required minimum quantity of allocated power tokens may be set based on a priority associated with operations performed by the IP block. The required minimum quantity of allocated power tokens may be set based on a desired response time for the IP block. The required minimum quantity of allocated power tokens may be set based on a type of operation associated with the IP block. The required minimum quantity of allocated power tokens may be based at least in part on other such considerations related to the particular IP block and/or groups of IP blocks.

Figure 6:
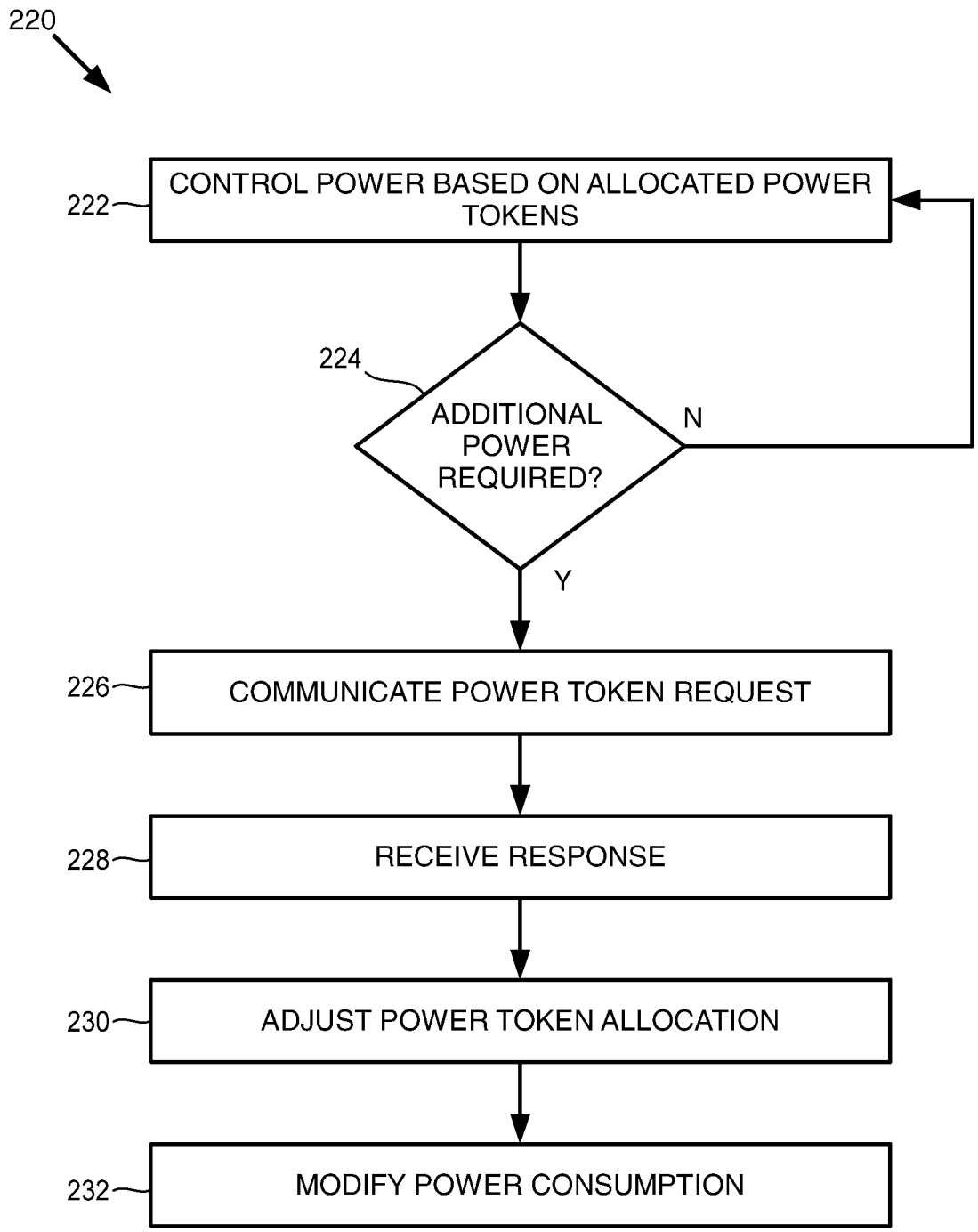
FIG. 6 is a flowchart illustrating a sequence of operations that may be performed by an IP block of FIG. 5 to request additional power.

Turning now to FIG. 6, this figure provides flowchart 220 that illustrates a sequence of operations that may be performed by a first IP block consistent with embodiments of the invention to request additional power tokens from one or more other interconnected IP blocks. The first IP block controls power consumption based on power tokens allocated thereto (block 222). In general, the first IP block may perform operations in accordance with a quantity of allocated power tokens indicated by the associated power token register. As discussed previously, controlling power consumption based on allocated power tokens comprises consuming power at the IP block according to the power consumption metric represented by the power tokens. For example, the first IP block may execute only the number of instructions indicated by allocated power tokens for a given time period, or the first IP block may run for only the indicated run time for a given time period.

The first IP block monitors power consumption and allocated power tokens to determine whether additional power is required (block 224). In general, the first IP block may determine that additional power consumption is needed for the given time period. For example, an instruction queue associated with the first IP block may include a quantity of instructions that exceeds the quantity indicated by the allocated power tokens, and the first IP block may determine that additional power is required to execute the instructions of the instruction queue in the given time period. During monitoring, if the IP block does not require additional power ("N" branch of block 224), the IP block continues controlling power consumption (block 222).

In response to determining that additional power is required for the first IP block ("Y" branch of block 224), the first IP block communicates a power token request to at least one other connected IP block (block 226). The power token request may include data indicating a needed quantity of power tokens and a granted quantity of power tokens. Each IP block that receives the power token request may adjust the needed quantity and the granted quantity based on whether the receiving IP block grants any allocated power tokens to the first IP block.

The first IP block receives a response to the power token request from an interconnected IP block, where the response indicates a quantity of power tokens granted to the first IP block from one or more interconnected IP blocks (block 228). The granted power tokens indicated in the response correspond to power tokens that were previously granted to one or more other interconnected IP blocks. While the response indicates a quantity, the quantity may be zero, indicating that none of the interconnected IP blocks granted power tokens to the first IP block. In some embodiments, a priority may be associated with each interconnected IP block, and in such embodiments, the priority associated with the first IP block may be lower than the other interconnected IP blocks such that the other interconnected IP blocks do not grant allocated power tokens for the request. In addition, the other interconnected IP blocks may not have any available allocated power tokens that may preclude the interconnected IP blocks from granting power tokens for the power token request. While in some situations, the other interconnected IP blocks may not grant any power tokens to the first IP block, in other situations, the response may grant at least one additional power token previously allocated to a different interconnected IP block.

The first IP block adjusts the allocated power tokens based on the additional power tokens granted in the response (block 230). In some embodiments, the first IP block adjusts the data stored in the power token register to reflect the additional power tokens granted in the response. While in some embodiments, the first IP block may perform an operation to adjust the power token register, in other embodiments, another IP block or associated processor may also perform the operation to adjust the power token register.

Based on the received response and/or the adjusted power token allocation, the first IP block modifies power consumption (block 232). For example, when the response includes additional granted power tokens, the first IP block may consume additional power as represented by the additionally granted power tokens from the one or more interconnected IP blocks. For example, if the first IP block required additional power tokens to execute instructions in an associated instruction queue, in response to receiving the response that grants additional power tokens, the first IP block may modify power consumption by executing the instructions in the associated instruction queue. Similarly, if the first IP block required additional power tokens to perform memory operations assigned to the first IP block, in response to receiving the response that grants additional power tokens, the first IP block may modify power consumption by performing the assigned memory operations represented by the granted additional power tokens.

Figure 7:
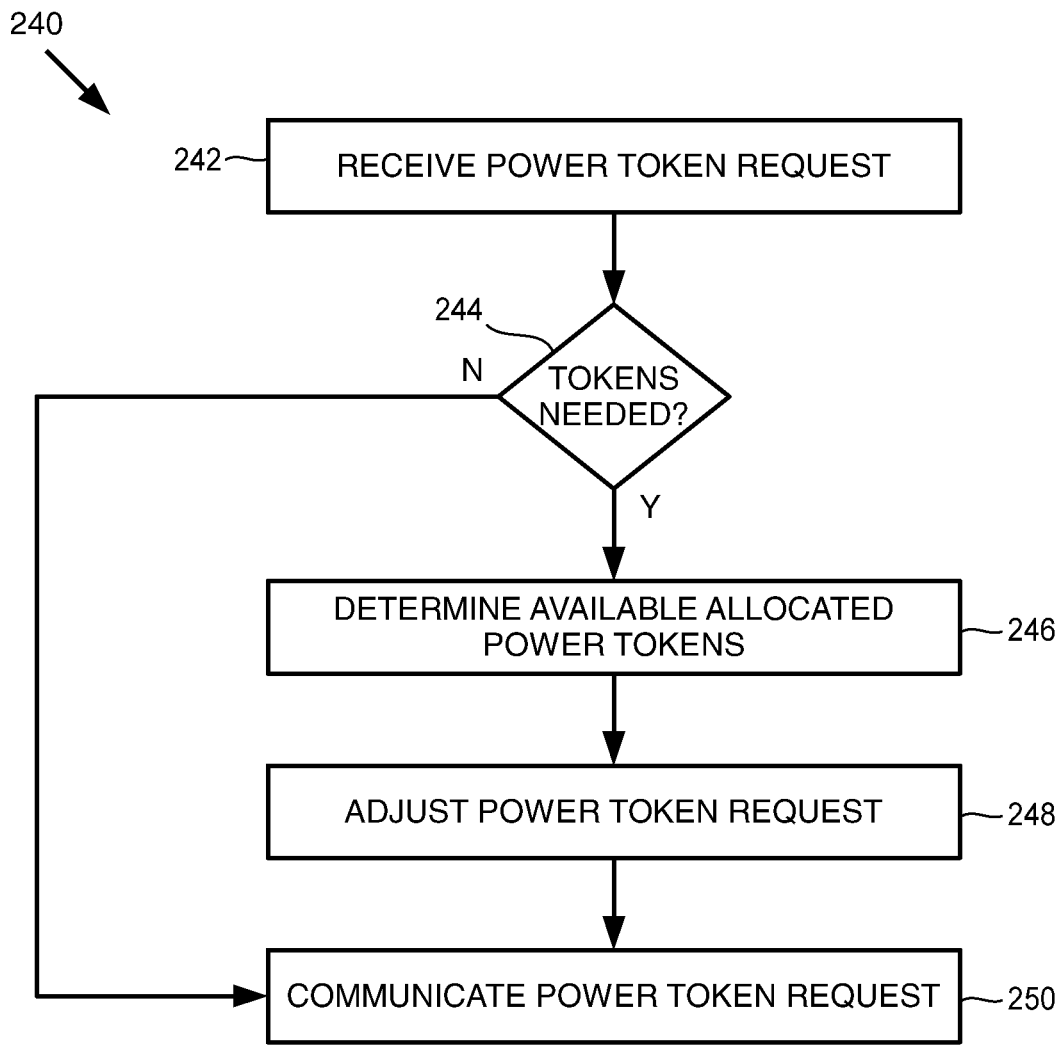
FIG. 7 is a flowchart illustrating a sequence of operations that may be performed by an IP block of FIG. 5 to grant allocated power to another IP block.

FIG. 7 provides flowchart 240 that illustrates a sequence of operations that a second IP block may perform to grant allocated power tokens to an interconnected first IP block. The second IP block may receive a power token request from another interconnected IP block (block 242). The second IP block may receive the power token request from the first IP block, or the second IP block may receive the power token request from another interconnected IP block. For example, if the first and second IP blocks are configured with other IP blocks in a token ring, the power token request may be communicated sequentially from one IP block to another IP block. The power token request may include data indicating a quantity of power tokens required by the first IP block, a quantity of power tokens granted for the request, an identifier associated with the first IP block, and/or other such information that may be useful for evaluating the power token request such as a priority associated with the first IP block.

The second IP block analyzes the power token request to determine whether any additional tokens are needed for the power token request (block 244). As discussed, the power token request may include data indicating a quantity of power tokens required by the first IP block, and/or a quantity of power tokens granted for the request. The second IP block may analyze such data to determine whether any additional power tokens are needed for the power token request. If no additional tokens are needed ("N" branch of block 244), the second IP block communicates the power token request without granting any power tokens for the power token request (block 250). In some embodiments, the received power token request may indicate that additional power tokens are not needed, and in such embodiments, the second IP block may forward the received power token request.

In response to determining that additional power tokens are needed for the power token request ("Y" branch of block 244), the second IP block may determine available allocated power tokens (block 246). As discussed previously, an available allocated power token generally corresponds to a power token not in use by the IP block, where the power token is generally representative of a type of metric for power consumption. Hence, an available allocated power token generally corresponds to an amount of power allocated to the particular IP block that is not being consumed.

The second IP block adjusts the power token request based at least in part on the determined available allocated power tokens (block 248). The power token request may include data indicating a quantity of power tokens needed for the request and a quantity of power tokens granted for the request. The second IP block may adjust the power token request by incrementing the quantity of power tokens granted for the request based on the quantity of power tokens that the second IP block will grant for the power token request. The second IP block may adjust the power token request by decrementing the quantity of power tokens. If the second IP block does not include any available allocated power tokens, then the second IP block may not adjust the power token request. Moreover, as discussed previously, in some embodiments, a minimum power token limit may be associated with the second IP block. In such embodiments, the minimum power token limit may limit the quantity of available allocated power tokens that the second IP block may grant for the power token request.

The second IP block communicates the power token request to at least one interconnected IP block (block 250). In some embodiments, the second IP block may communicate the adjusted power token request to the first IP block. In some embodiments, the second IP block may communicate the adjusted power token request to another interconnected IP block. For example, if the first and second IP blocks are configured in a token ring with other interconnected IP blocks, the second IP block may communicate the power token request to a next interconnected IP block in the token ring.

As discussed with respect to FIGS. 6 and 7, embodiments of the invention facilitate distributing power in a processor at an IP block level. Moreover, consistent with embodiments of the invention, a power consumption limit represented by power tokens may be dynamically reallocated between interconnected IP blocks at an IP block level. In such embodiments, a power token request may be communicated by an IP block that determines that additional power consumption above the power consumption limit allocated to the IP block may be required to perform operations in a given time period. The IP block may predict a requirement for additional power by monitoring an instruction queue associated with the IP block, monitoring memory transaction operations queued to be performed by the IP block, and/or analyzing a run time associated with operations to be performed by the IP block.

The IP block may communicate a power token request indicating the quantity of power tokens required and the quantity of power tokens granted responsive to determining that additional power is required. As the power token request is communicated to one or more interconnected IP blocks, the quantity of power tokens required may be decremented as additional power tokens are granted, and the quantity of power tokens granted may be incremented. Each IP block of the interconnected IP blocks controls power consumption based on allocated power tokens. As such, a granting IP block may reduce power consumption responsive to granting a power token for a power token request. Similarly, a requesting IP block may increase power consumption based on additional power tokens granted to the requesting IP block for a communicated power token request.

Figure 8:
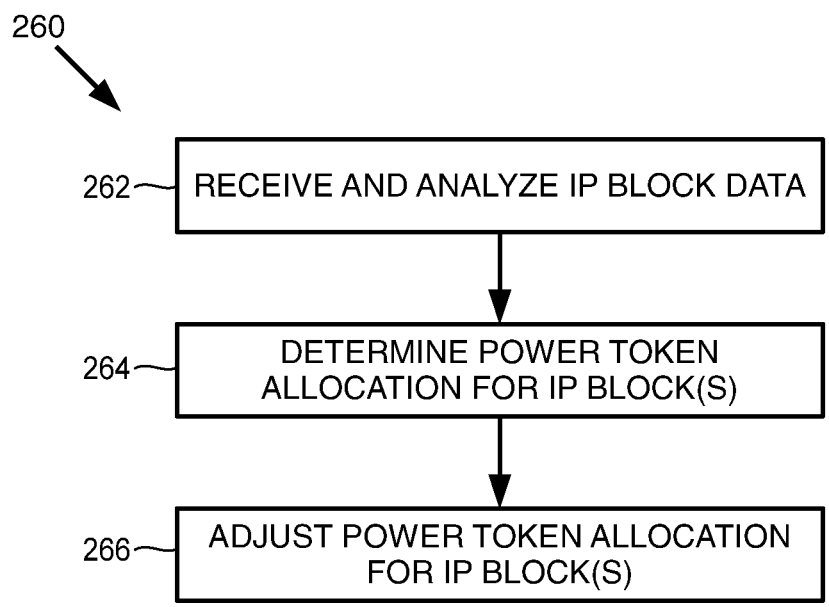
FIG. 8 is a flowchart illustrating a sequence of operations that may be performed by the power management block of FIG. 5 to adjust allocated power for an IP block.

Turning now to FIG. 8, this figure provides a flowchart 260 that illustrates a sequence of operations that may be performed by a power management block consistent with embodiments of the invention to adjust the allocation of power tokens for a plurality of interconnected IP blocks. The power management block receives data associated with one or more of the IP blocks (block 262). For example, the power management block may receive temperature data collected by a temperature sensor proximate the IP blocks. In another example, the power management block may receive data indicating a priority associated with one or more of the IP blocks. As a third example, the power management block may receive data indicating a power consumption target associated with one or more of the IP blocks.

The power management block may determine the power token allocation for one or more interconnected IP blocks based on the received data associated with one or more IP blocks (block 264). In some embodiments, the power management block may analyze an associated power token register for one or more of the IP blocks to determine the quantity of power tokens allocated to the one or more IP blocks. In some embodiments, the received data may indicate one or more particular IP blocks, and the power management block may analyze the power token register associated with each of the one or more particular IP blocks to determine the quantity of power tokens allocated to the one or more particular IP blocks. While in some embodiments the power management block may analyze the power token register of one or more IP blocks, in some embodiments, a power token allocation register associated with the power management block may store data indicating the allocation of power tokens for the interconnected IP blocks, and the power management block may analyze the power token register of the power management block to determined the allocation of power tokens.

Based on the allocation of power tokens and the received data associated with one or more of the IP blocks, the power management block may adjust the power token allocation of one or more of the IP blocks (block 266). In some embodiments, the power management block may perform an operation to adjust the data stored in the power token registers of one or more IP blocks to thereby adjust power token allocation for the one or more IP blocks. In some embodiments, the power management block may communicate a command to one or more IP blocks to thereby cause the one or more IP blocks to adjust the associated power token register to adjust the power token allocation for the IP block.

Figure 9:
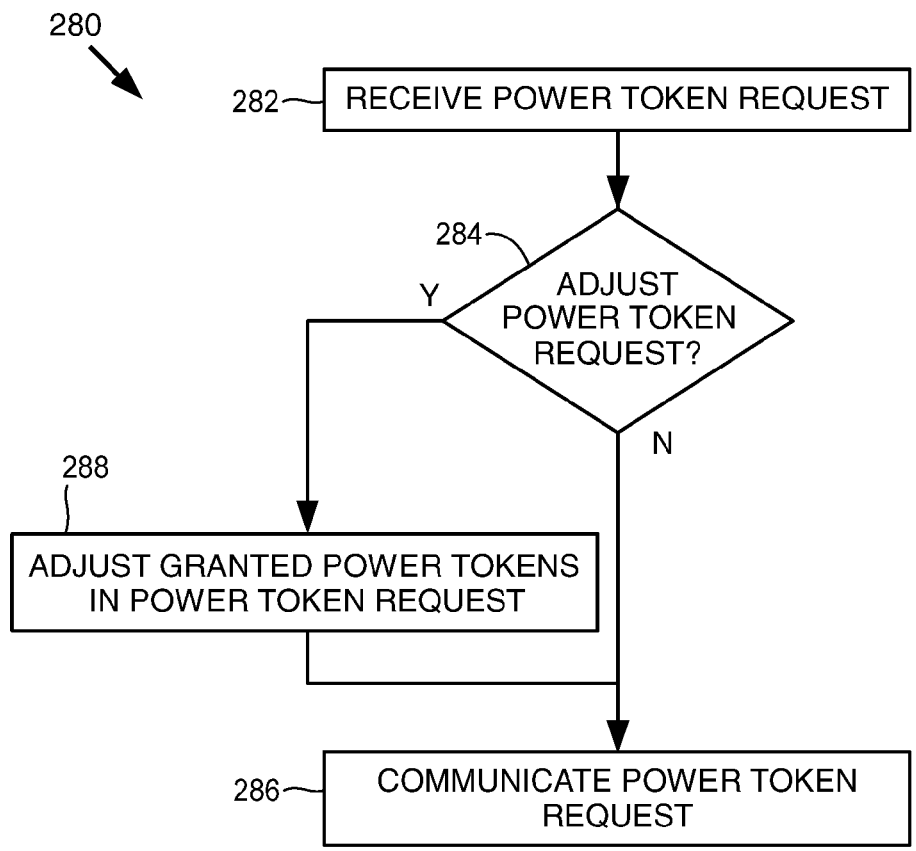
FIG. 9 is a flowchart illustrating a sequence of operations that may be performed by the power management block of FIG. 5 to adjust a power token request of an IP block.

Turning now to FIG. 9, this figure provides flowchart 280 that illustrates a sequence of operations that may be performed by a power management block to adjust a power token request of a connected IP block. As discussed above with respect to FIGS. 6 and 7, a first IP block requiring additional power may communicate a power token request to request interconnected IP blocks to grant allocated power tokens to the first IP block. In some embodiments, the power management block may be connected to the interconnected IP blocks, such that the power management block may receive the power token request prior to the power token request returning to the first IP block (block 282).

The power management block may analyze the power token request for the first IP block to determine whether to adjust the power token request (block 284). In some embodiments, the power management block may determine whether to adjust the received power token request based on a power consumption target associated with the first IP block, a priority associated with the first IP block, and/or a temperature associated with the first IP block. For example, if a temperature associated with the first IP block is within a given range of a temperature limit, the power management block may determine that the power token request should be decremented by one or more granted power tokens to thereby prevent the first IP block from exceeding the temperature limit. In another example, the first IP block may be associated with a high priority relative to other interconnected IP blocks, and the power management block may determine that the power token request should be incremented by one or more granted power tokens to thereby facilitate higher performance processing of the operations of the first IP block. In this example, the power management block may increment the granted power tokens by one or more additional power tokens, where the additional power tokens may be unallocated to any IP blocks managed by the power management block. In some embodiments, the additional tokens may be allocated to one or more other interconnected IP blocks, and the power management block may cause the other interconnected IP blocks to decrement the power tokens allocated thereto based on a priority associated with the first IP block and the other interconnected IP blocks. In this example, the power management block may cause the one or more other interconnected IP blocks to decrement allocated power tokens based on a priority associated with the first IP block and the one or more other IP blocks.

In response to determining that the power token request does not need to be adjusted ("N" branch of block 284), the power management block communicates the power token request over the communication bus (block 286). The power management block may communicate the power token request to the first IP block, or in some embodiments, the power management block may communicate the power token request on the token ring. In response to determining that the power token request should be adjusted ("Y" branch of block 284), the power management block may adjust the power token request based at least in part on the power tokens allocated to the first IP block, power tokens allocated to other interconnected IP blocks, a priority associated with the first IP block and/or one or more other interconnected IP blocks, a temperature associated with the first IP block and/or one or more other interconnected IP blocks, a power consumption target associated with the first IP block, one or more other interconnected IP blocks and/or the processor. After adjusting the power token request, the power management block may communicate the power token request (block 286) as described above.

Figure 10:
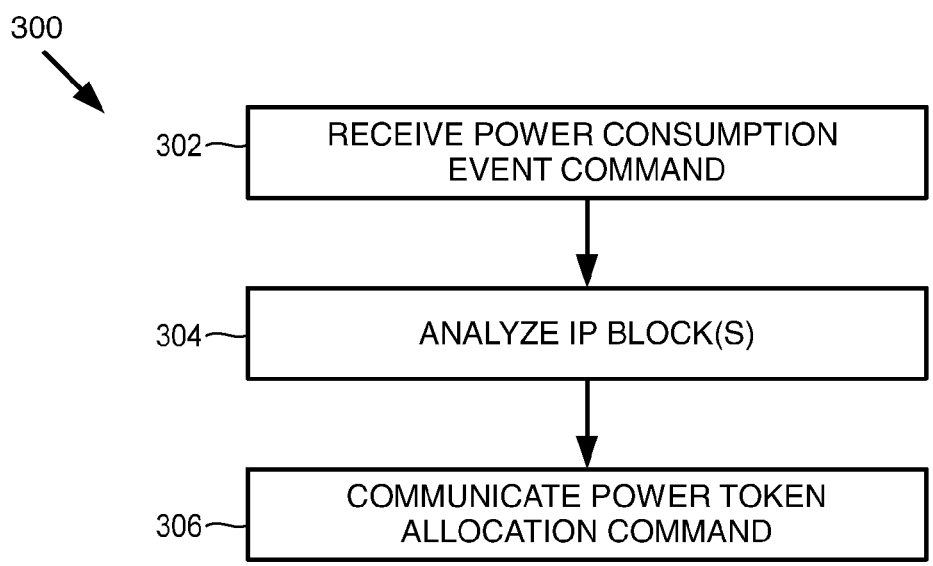
FIG. 10 is a flowchart illustrating a sequence of operations that may be performed by the power management block of FIG. 5 to adjust power allocation for an IP block.

FIG. 10 provides a flowchart 300 that illustrates a sequence of operations that a power management block connected to a plurality of interconnected IP blocks of a processor may perform to adjust power token allocation of one or more of the interconnected IP blocks. The power management block may receive data including a power event command (block 302). For example, the processor may be transitioning from a high power mode (i.e., high performance) to a low power mode (i.e., high efficiency). Therefore, the power consumption of the processor will should decrease. In this example, the power management block may receive data indicating that the processor is switching to a low power mode. In another example, the power management block may receive data indicating that one or more of the interconnected IP blocks is to reduce power consumption. In this example, the processor may reduce the performance of IP blocks associated with a particular type of operation, such as memory transactions, and the power management block may receive data indicating that power consumption of any interconnected IP blocks performing memory transaction operations should be reduced.

Responsive to receiving the power consumption event command, the power management block may analyze one or more of the interconnected IP blocks to determine a power token allocation of each of the one or more of the IP blocks, a priority of each of the one or more of the IP blocks, at type of operation associated with each of the one or more IP blocks, and/or a temperature associated with each of the one or more IP blocks. Based at least in part on the received power consumption event command and the analysis of the one or more IP blocks, the power management block may communicate a power token allocation command to one or more of the IP blocks to thereby cause the one or more IP blocks to adjust the quantity of power tokens allocated thereto (block 306). In these embodiments of the invention, the power management block may be utilized to adjust power consumption at the IP block level responsive to power consumption events in the processor. For example, the processor may distribute high priority tasks to at least one IP block managed by the power management block, and the processor may communicate a power consumption event command to the power management block indicating that the at least one IP block is to be associated with a high priority. The power management block may communicate a command to the at least one IP block to thereby cause the at least one IP block to increment the power tokens allocated thereto. Concurrently, the power management block may communicate a command to one or more other interconnected IP blocks to thereby cause the one or more other IP blocks to decrement the power tokens allocated thereto.

FIGS. 11A-F provide block diagrams of example interconnected IP blocks 104w-z and a connected power management block 204, where a first IP block 104w communicates a power token request 302 to the other interconnected IP blocks 104x-z. In this example, the interconnected IP blocks 104w-z are configured in a token ring, such that the power token request 302 may be communicated sequentially from the first IP block 104w to a second IP block 104x, from the second IP block 104x to a third IP block 104y, from the third IP block 104y to a fourth IP block 104z, and from the fourth IP block 104z to the first IP block 104w. While the provided example includes four interconnected IP blocks 104w-z configured in a token ring, embodiments of the invention may include more or less interconnected IP blocks configured in a token ring or a different logical communication configuration. The power management block 204 may receive, analyze, and adjust the power token request 302 prior to the power token request returning to the first IP block 104w.

Figure 11A:
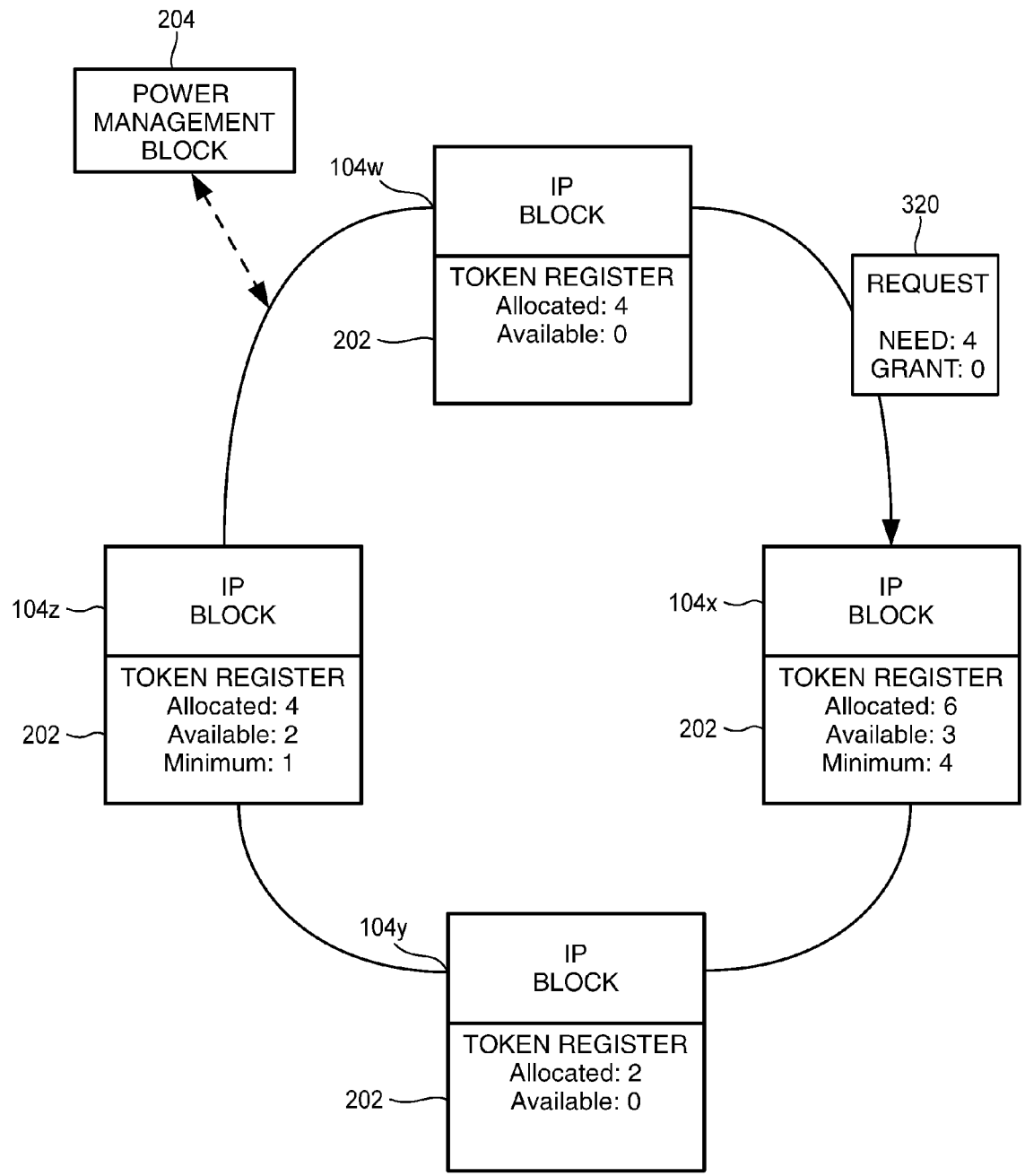
FIGS. 11A-F are block diagrams illustrating an example of the sequence of operations shown in FIGS. 6, 7, and 9.

Referring specifically to FIG. 11A, the first IP block 104w includes an associated token register 202 that indicates that the four power tokens are allocated to the first IP block 104w. In this example, the first IP block 104w determines that additional power is required for a given time period. The first IP block 104w communicates the power token request 302, which in this example indicates that the first IP block 104w requires four additional power tokens worth of power. The power token request 302 is communicated to the second IP block 104x of the token ring. In the provided example, prior to receiving the power token request, a power token register 202 associated with second IP block 104x indicates that the second IP block 104x has six power tokens allocated therewith, three power tokens available, and a power token minimum of four power tokens. As shown, the power token request 302 initially indicates that four power tokens are required by the first IP block 104w and zero power tokens have been granted for the request.

Figure 11B:
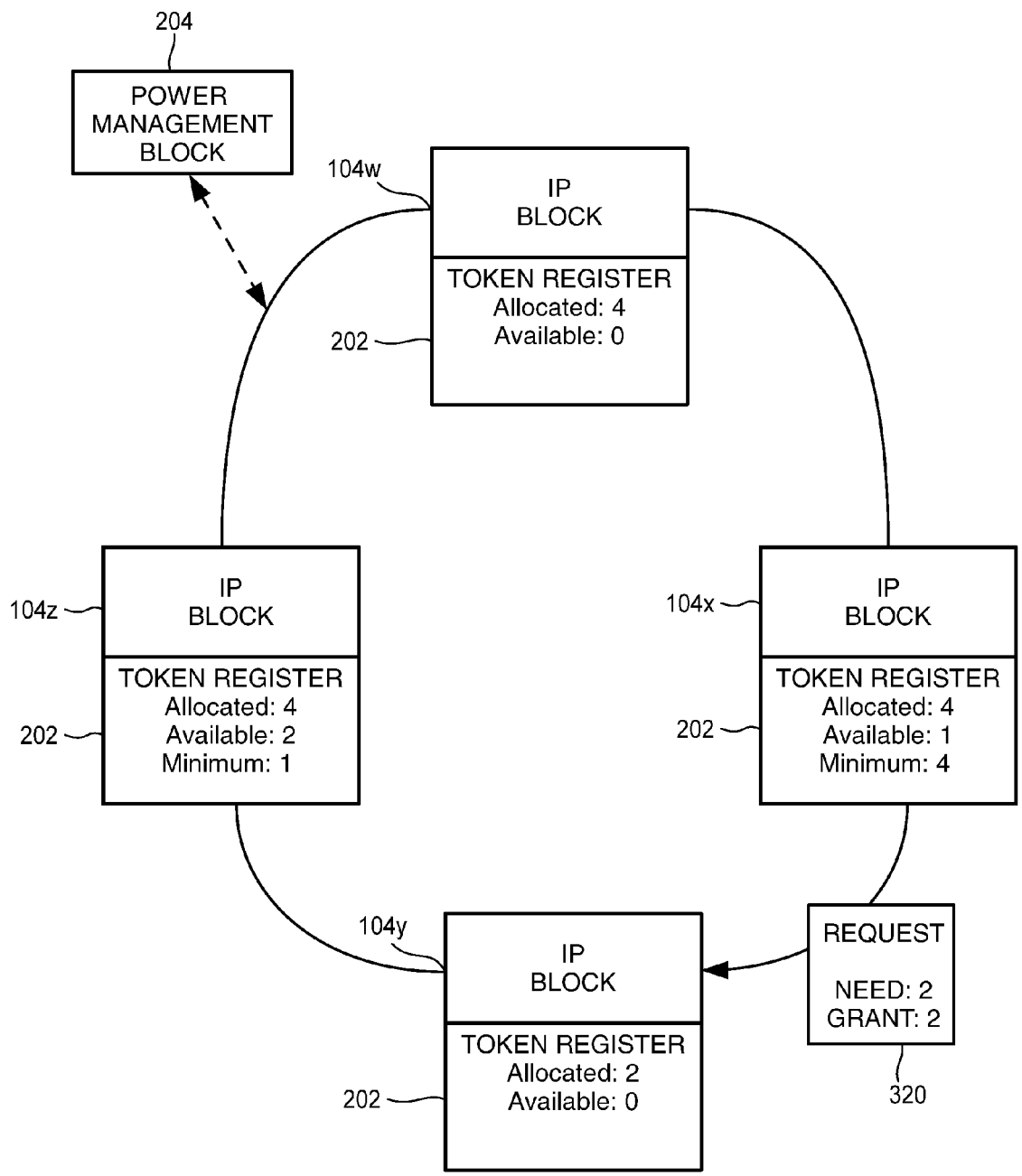

The second IP block 104x has six allocated power tokens and three power tokens available; however, the second IP block may only grant two power tokens for the power token request 302 because the second IP block 104x has an associated power token minimum of four power tokens. Turning now to FIG. 11B, the second IP block 104x granted two power tokens (thereby retaining the required minimum allocation of four power tokens) to the power token request 302. The second IP block 104x adjusted the data of the data request to indicate that two power tokens are required and two power tokens have been granted for the power token request 302, and the second IP block 104x communicates the power token request 302 to the third IP block 104y.

Figure 11C:
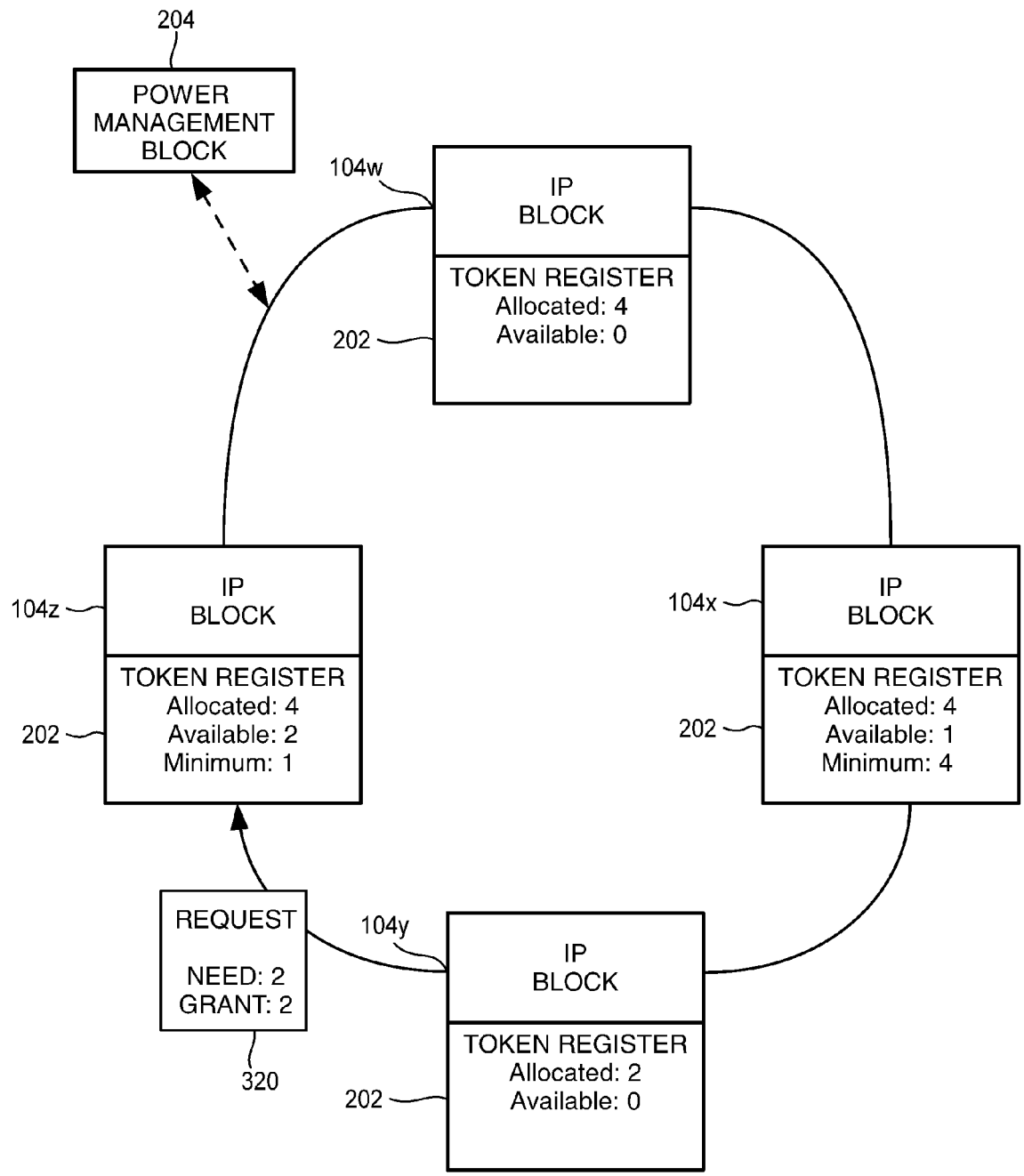

The power token register 202 associated with the third IP block 104y indicates that the third IP block 104y does not have any available power tokens associated therewith—i.e., the third IP block 104y is consuming the power represented by the allocated power tokens. As such, as shown in FIG. 11C, the third IP block 104y communicates the power token request 302 without adjusting the quantity required or granted to the fourth IP block 104z. The power token register 202 associated with the fourth IP block indicates that the fourth IP block has two available power tokens, and granting the two available power tokens will not cause the fourth IP block 104z to fall below the minimum allocation of power tokens for the fourth block (one power token).

Figure 11D:
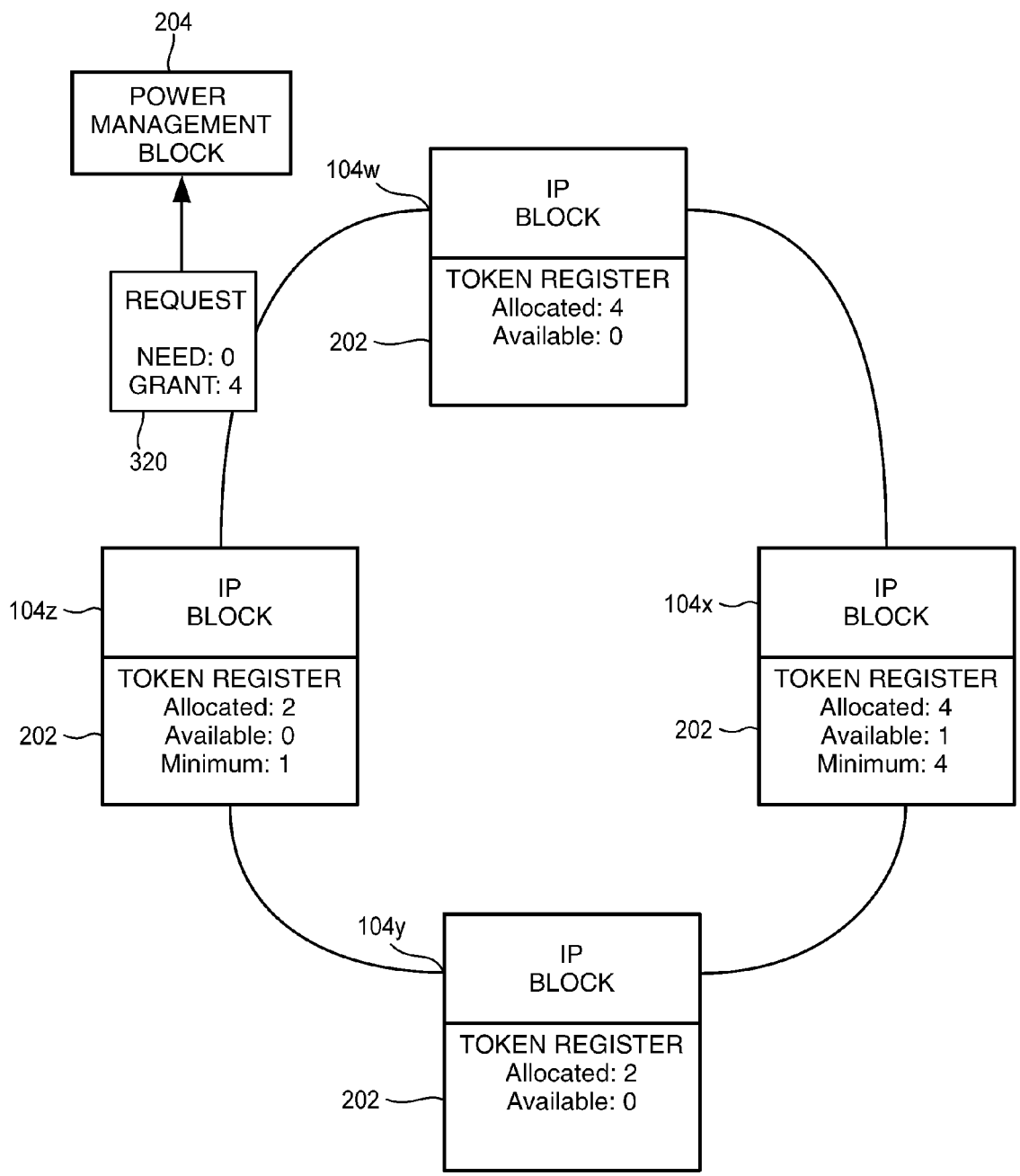

As shown in FIG. 11D, the fourth IP block 104z adjust the power token request 302 to indicate that zero power tokens are needed to fill the request and that four power tokens have been granted. In addition, after granting two available power tokens to the power token request, the fourth IP block 104z adjusts the power token register 202 to indicate that two power tokens are allocated and that the fourth IP block 104z does not have any available power tokens. The fourth IP block 104z communicates the adjusted power token request to the next IP block of the token ring, which is the first IP block 104w.

Figure 11E:
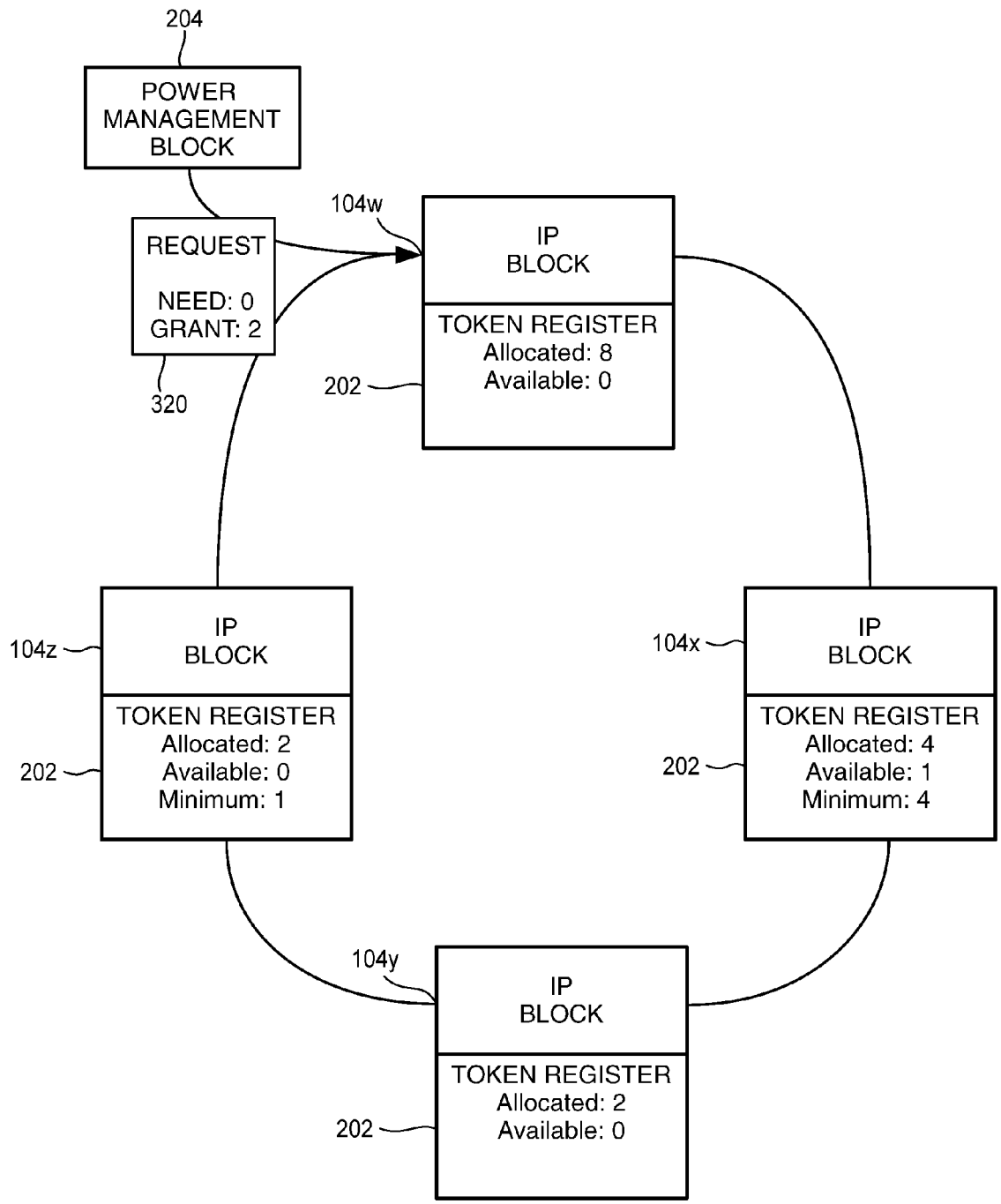

In this example, prior to the first IP block 104w receiving the power token request 302, the power management block receives the power token request 302. In this example, as shown in FIG. 11E, the power management block adjusts the power token request by reducing the quantity of granted power tokens. As discussed previously, the power token request may adjust the quantity of granted power tokens in a power token request based at least in part on a temperature, a power consumption target, a priority, and/or other such limits/attributes. The power management block communicates the adjusted power token request 302 to the first IP block 104w.

Figure 11F:
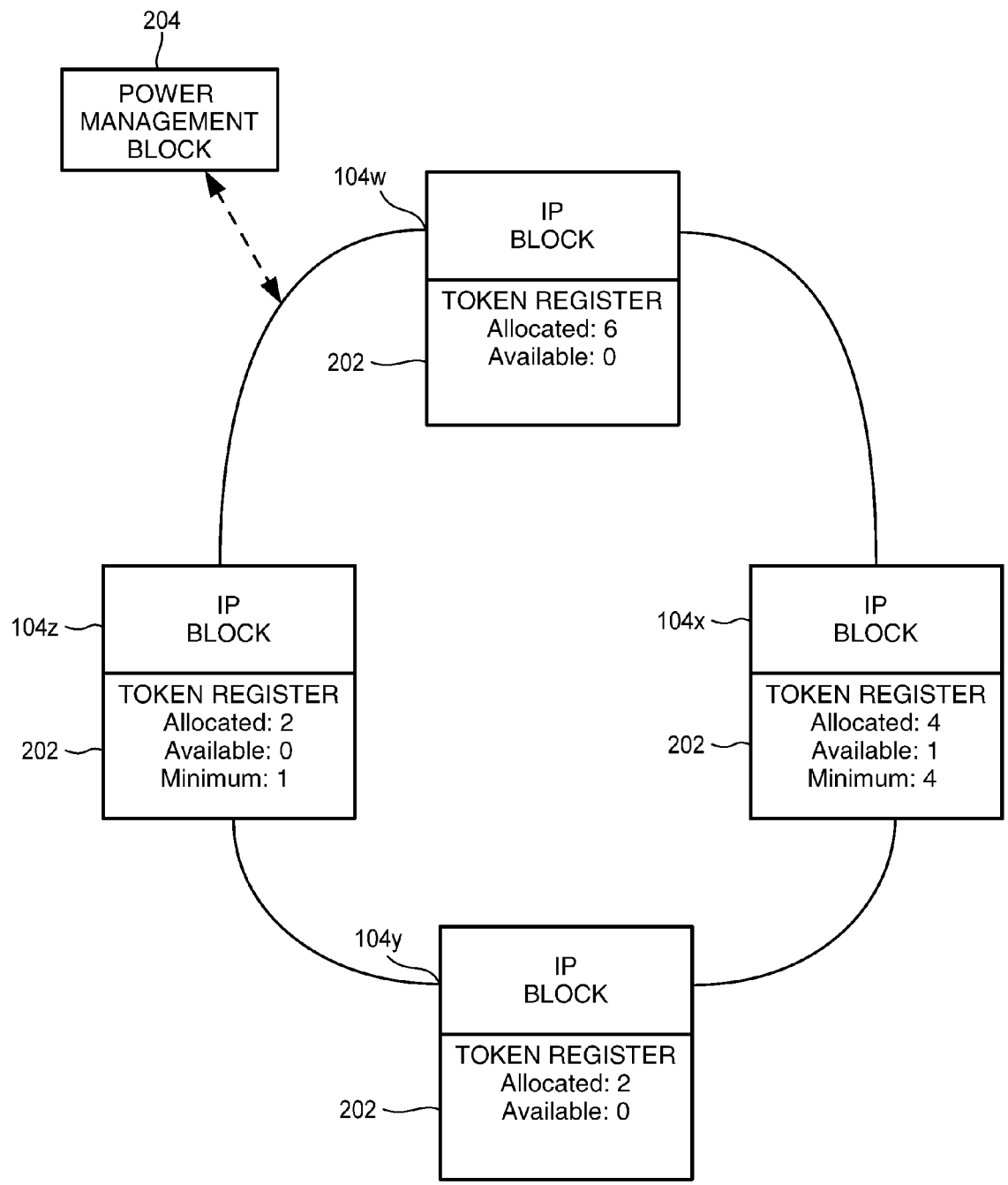

Since the first IP block generated the power token request 302, the received power token request 302 is the response for the first IP block 104w. As shown in FIG. 11F, after receiving the response, the first IP block 104w may adjust the associated power token register 202 to indicate that six power tokens are allocated to the first IP block 104w (the four power tokens that were allocated before the power token request and the additional two power tokens granted by the other IP blocks 104x-z for the request after the adjustment by the power management block 302).

As such, embodiments of the invention include a distributed power management scheme that utilizes power tokens to allocate and dynamically re-allocate power consumption at the IP block level for a processor. In some embodiments, such power management includes a token ring configured communication bus that interconnects all participating IP blocks. In some embodiments, such power management includes a power management block connected to the participating IP blocks that may adjust power token allocation of one or more of the IP blocks and/or adjust power token requests. The interconnected structure of the communication bus of participating IP blocks facilitates extensibility and scalability to one or more IP blocks on a common communication bus. When an IP block needs power tokens it will insert a request onto the communication bus for a specific number of power tokens. The communication bus may be snooped by all IP blocks, and power tokens may be granted, if they are available and/or based on priority, by adjusting the request. Such adjusting may include decrementing the request count by the number of power tokens available and/or incrementing a granted count at the IP block and reinserting the request onto the communication bus. When the request gets back around to the originating IP block, the IP block determine how many tokens they have been granted, and the IP block may modify power consumption accordingly. Moreover, the power management block may intervene to adjust the power token request based at least in part on a power consumption event of the processor, a power consumption limit, a temperature, a priority, a type of operation, and/or other such factors.

In some embodiments, a system may start up with each IP block having a preconfigured number of tokens. Each IP block would then decrement it's power token count based on usage, and increment it's power token count over time based on a configurable counter and system power targets. If the IP block is not being used, the unused IP block's tokens may be distributed to other units. Moreover, protocol may be utilized to define a time window such that available power tokens over a certain amount are given back to the system (i.e., unallocated), and power tokens under a certain threshold are saved for use of the IP block based on necessary startup requirements for the system. In addition, an IP block may not decrement to zero allocated power tokens if it needs to respond quickly to system demands. This window may also used to determine when power token requests should be communicated on the communication bus to ensure uninterrupted execution by the requesting IP block when power tokens are available. The time window may be determined and tuned based on the round trip latency of communication bus, including for example a token ring in some system-on-a-chip (SOC) implementations. Each IP block may include an associated software controlled register to manage thresholds for allowed tokens. Tokens may represent run time, instructions executed, memory transactions performed, and/or some other metric applicable to power consumption for the specific IP block.

With the distributed processing system, such as a system on a chip processor, a centralized power management block may facilitate chip level management. For example, in a processor that implements lower power solutions, the power management block may dynamically remove power tokens from connected IP blocks. For example, processor components may requirements require different chip level power envelopes: some components may be able to handle 50 W, while other components may support 100 W, but both may be configured on the same processor. The power distribution to the various components may be controlled through the dynamic monitoring and allocation of power tokens, and particularly in some embodiments using a power management block. The power tokens may be injected into one or more groups of interconnected IP blocks based on input from board level hardware, and/or software controlled input. The processor may initialize with each IP block having a preconfigured number of tokens, or by having the power management block dynamically insert power tokens to connected IP blocks.

Embodiments of the invention may dynamically adjust power consumption of the IP blocks in response to power consumption events of the processor. For example, when a voltage or clock island is turned off, the power management block may revoke power tokens and store them in a pool to be re-allocated when the voltage/clock island is re-started. Moreover, the power management block may control high/low priority IP blocks with more power tokens for some IP blocks cores and less for lower priority service IP blocks. Sensors, such as thermal sensors may collected data to identify localized hot spots, and when a hot spot is found, the power management block may reduce power consumption or even shut down IP blocks proximate the hot spot. Power token allocation may be adjusted by communicating a command on the communication bus targeting particular IP blocks. For example, the power management block may include an identifier that identifies one or more particular interconnected IP blocks. The power management block may adjust power token allocation based on data collected by associated environmental sensors and/or limitations of such environmental sensors. For example, the power management block may revoke power tokens because a power consumption time slice represented by the power tokens may be much longer than a thermal sensor readout, and the power management block may shut down IP blocks due to a high temperature situation. The selection of IP blocks for shutdown may be based at least in part on on priority and/or urgency of thermal sensor feedback.

Additional advantages and modifications will readily appear to those skilled in the art. Thus, the invention in its broader aspects is therefore not limited to the specific details, representative apparatus and method, and illustrative example shown and described. In particular, any of the blocks of the above flowcharts may be deleted, augmented, made to be simultaneous with another, combined, or be otherwise altered in accordance with the principles of the invention. Accordingly, departures may be made from such details without departing from the spirit or scope of applicants' general inventive concept.

What is claimed is:

1. A circuit arrangement comprising:
a plurality of interconnected integrated processor (IP) blocks and a power management block configured in a token ring,
wherein each IP block includes a power token allocation register configured to store an indication of a power token quantity allocated to the IP block, and each IP block is configured to:
control power consumption of the IP block based on the power token quantity allocated to the IP block indicated in the power token allocation register,
responsive to determining that additional power is required for the IP block, communicate a power token request including a request quantity based on additional power required for the IP block and a granted quantity on the token ring,
receive a response to the power request from the token ring including the granted quantity of power tokens from the other IP blocks of the token ring,
adjust the token quantity allocated to the IP block in the power token allocation register based on the granted quantity of the response to the power request,
modify power consumption of the IP block based on the adjusted token quantity allocated to the IP block indicated in the token allocation register, and
responsive to receiving a power token request from another IP block on the token ring:
determine a quantity of allocated tokens to grant for the power token request,
adjust the power token allocation register, the request quantity of the power token request, and the granted quantity of the power token request based on the determined quantity of allocated tokens to grant for the power token request, and
communicate the power token request including the adjusted request quantity and granted quantity to a next IP block connected to the token ring,
wherein the power management block is configured to remove allocated power tokens from the IP blocks of the token ring and allocate additional power tokens to IP blocks of the token ring to thereby manage power consumption of the IP blocks of the token ring.

2. A method for managing power distribution in a system on a chip including a plurality of interconnected integrated processor (IP) blocks and a power management block, each IP block including allocated power tokens, the method comprising:
controlling power consumption of a first IP block based on allocated power tokens;
in response to determining that additional power is required at the first IP block, communicating a power token request to a second interconnected IP block;
at the second IP block and in response to receiving the power token request:

determining a particular quantity of power tokens allocated to the second IP block to grant for the power token request, adjusting a requested quantity and a granted quantity of the power token request based on the determined particular quantity of power tokens, and communicating the power token request including the adjusted requested quantity and granted quantity to at least one other IP block;

receiving a response to the power token request at the first IP block that grants at least the determined particular quantity of power tokens previously allocated to the second IP block;

modifying power consumption of the first IP block based at least in part on the granted quantity of power tokens indicated in the response;

receiving temperature data indicating a temperature associated with the plurality of interconnected IP blocks at the power management block; and controlling power consumption of the interconnected IP blocks with the power management block by adjusting the allocation of power tokens for at least one IP block, wherein controlling power consumption of the interconnected IP blocks with the power management block by adjusting the allocation of power tokens for at least one IP block is based at least in part on the received temperature data, and wherein controlling power consumption of the interconnected IP blocks with the power management block by adjusting the allocation of power tokens for at least one IP block comprises removing at least one power token allocated to an IP block in response to the indicated temperature of the temperature data being above a temperature threshold associated with the IP blocks.

3. The method of claim 2, wherein controlling power consumption of the interconnected IP blocks with the power management block by adjusting the allocation of power tokens for at least one IP block further comprises:

allocating at least one additional power token to at least one IP block based at least in part on the indicated temperature of the temperature data.

4. The method of claim 2, wherein controlling power consumption of the interconnected IP blocks with the power management block by adjusting the allocation of power tokens for at least one IP block is based at least in part on a processing priority associated with one or more IP blocks.

5. The method of claim 4, wherein controlling power consumption of the interconnected IP blocks with the power management block by adjusting the allocation of power tokens for at least one IP block comprises:

removing at least one power token allocated to an IP block processing a low priority task.

6. The method of claim 4, wherein controlling power consumption of the interconnected IP blocks with the power management block by adjusting the allocation of power tokens for at least one IP block comprises:

allocating at least one additional power token to at least one IP block processing a high priority task.

7. The method of claim 2, wherein each power token corresponds to at least one of the following: a run time, a quantity of instructions to execute, and a quantity of memory transactions to perform.

8. The method of claim 2, wherein each IP block includes a power token allocation register that indicates a quantity of power tokens allocated to the IP block, controlling power consumption of the first IP block based on allocated power tokens is based at least in part on the quantity of power tokens allocated to the first IP block as indicated by the power token allocation register of the first IP block, and controlling power consumption of the interconnected IP blocks with the power management block by adjusting the allocation of power tokens for at least one IP block comprises:

communicating a command from the power management block to the first IP block that causes the first IP block to adjust the indicated quantity of power tokens allocated to the first IP block in the power allocation register.

9. The method of claim 2, wherein controlling power consumption of the interconnected IP blocks with the power management block by adjusting the allocation of power tokens for at least one IP block comprises:

prior to receiving the response to the power request at the first IP block, receiving the response to the power request at the power management block;

adjusting the response to the power token request; and communicating the adjusted response to the power token request from the power management block to the first IP block.

10. The method of claim 9, wherein adjusting the response to the power token request comprises:

allocating at least one additional power token to the at least one power token granted in the response to the power token request.

11. A circuit arrangement comprising:

a plurality of interconnected integrated processor (IP) blocks, wherein each IP block is configured to:

control power consumption of the IP block based on allocated power tokens, communicate a power token request to at least one other interconnected IP block based at least in part on a determination that additional power is required for the IP block, receive a response to the power token request at the IP block that grants at least one additional power token previously allocated to a different interconnected IP block, modify power consumption of the IP block based at least in part on the at least one additional power token granted in the response, and responsive to receiving a power token request from another IP block on the token ring:

determine a particular quantity of allocated tokens to grant for the power token request, adjust a request quantity and a granted quantity of the power token request based on the particular quantity, and communicate the power token request including the adjusted request quantity and granted quantity to a next IP block; and a power management block connected to the interconnected IP blocks, the power management block configured to adjust the allocation of power tokens for at least one IP block to thereby control power consumption of the interconnected IP blocks, wherein the power management block is further configured to receive temperature data indicating a temperature associated with the plurality of interconnected IP blocks, wherein the power management block is configured to adjust the allocation of power tokens for at least one IP block to thereby control power consumption of the interconnected IP blocks based at least in part on the received temperature data, and wherein the power management block is configured to adjust the allocation of power tokens for at least one IP block to thereby control power consumption of the interconnected IP blocks by removing at least one power token allocated to an interconnected IP block responsive to the indicated temperature being above a temperature threshold associated with the IP blocks.

12. The circuit arrangement of claim 11, wherein the power management block is configured to adjust the allocation of power tokens for at least one IP block to thereby control power consumption of the interconnected IP blocks further by:
  allocating at least one additional power token to an interconnected IP block based at least in part on the indicated temperature of the temperature data.

13. The circuit arrangement of claim 11, wherein the power management block is configured to adjust the allocation of power tokens for at least one IP block to thereby control power consumption of the interconnected IP blocks based at least in part on a processing priority associated with one or more of the interconnected IP blocks.

14. The circuit arrangement of claim 13, wherein the power management block is configured to adjust the allocation of power tokens for at least one IP block to thereby control power consumption of the interconnected IP blocks by:
  removing at least one power token allocated to an IP block processing a low priority task.

15. The circuit arrangement of claim 13, wherein the power management block is configured to adjust the allocation of power tokens for at least one IP block to thereby control power consumption of the interconnected IP blocks by:
  allocating at least one additional power token allocated to an IP block processing a high priority task.

16. The circuit arrangement of claim 11, wherein each IP block comprises a power token allocation register that indicates a quantity of power tokens allocated to the IP block,
  wherein the power management block is configured to adjust the allocation of power tokens for at least one IP block to thereby control power consumption of the interconnected IP blocks based at least in part on the quantity of power tokens allocated to at least one IP block, and
  wherein the power management block is configured to adjust the allocation of power tokens for at least one IP block to thereby control power consumption of the interconnected IP blocks by:
    communicating a command to at least one IP block that causes the at least one IP block to adjust the indicated quantity of allocated power tokens stored in the power token allocation register.

17. The circuit arrangement of claim 11, wherein the power management block is configured to adjust the allocation of power tokens for at least one IP block to thereby control power consumption of the interconnected IP blocks by:
  receiving the response to the power request, adjusting the response to the power token request, and communicating the adjusted response to the power token request from the power management block.

18. An integrated circuit device comprising the circuit arrangement of claim 11.

* * * * *